(12) United States Patent
Miller

(10) Patent No.: US 11,787,064 B2
(45) Date of Patent: Oct. 17, 2023

(54) MASS-CONTROLLED VISCOUS MATERIAL DEPOSITION SYSTEM, APPARATUS AND METHOD

(71) Applicant: William Miller, Walnut Creek, CA (US)

(72) Inventor: William Miller, Walnut Creek, CA (US)

(*) Notice: Subject to any disclaimer, the term of this patent is extended or adjusted under 35 U.S.C. 154(b) by 66 days.

(21) Appl. No.: 17/187,835

(22) Filed: Feb. 28, 2021

(65) Prior Publication Data

US 2022/0274263 A1 Sep. 1, 2022

(51) Int. Cl.
*B25J 9/16* (2006.01)
*B25J 13/08* (2006.01)
*B25J 11/00* (2006.01)

(52) U.S. Cl.
CPC ........... *B25J 13/085* (2013.01); *B25J 9/1664* (2013.01); *B25J 11/0045* (2013.01)

(58) Field of Classification Search
CPC .... B25J 13/085; B25J 9/1664; B25J 11/0045; B25J 11/0075; G05B 19/4099; G05B 2219/49013; G05B 2219/49021
See application file for complete search history.

(56) References Cited

FOREIGN PATENT DOCUMENTS

JP 2020011311 A * 1/2020

OTHER PUBLICATIONS

Screen captures from YouTube video clip entitled "[Product] Softcream Robot 2019年モデルの動作フロー動画_201902," 4 pages, uploaded on May 16, 2019 by user "Connected Robotics". Retrieved from Internet: <https://www.youtube.com/watch?v=dY3gRDE0Xhs>. (Year: 2019).*

* cited by examiner

*Primary Examiner* — Abby Y Lin
*Assistant Examiner* — Dylan Brandon Mooney
(74) *Attorney, Agent, or Firm* — West & Associates, A PC; Stuart J. West; Charlotte Rodeen-Dickert

(57) ABSTRACT

A system and/or method comprising providing a robotic control structure having a support structure, said support structure being adapted and configured to be selectively positionable along a prescribed path by said robotic control structure; providing a viscous material deposition system adapted and configured to control deposition of a viscous material from said viscous material deposition system; providing a load sensor associated with said robotic control structure adapted and configured to determine a load of said viscous material supported by said support structure; and positioning said support structure along said prescribed path, wherein said positioning is controlled at least in part based upon said load.

18 Claims, 15 Drawing Sheets

MASS-CONTROLLED VISCOUS MATERIAL DEPOSITION SYSTEM, APPARATUS AND METHOD

BACKGROUND

Technical Field

The present device relates to the field of robotics and more particularly to the field of robotic deposition systems for viscous materials.

Background

Multiple and various robotic delivery systems exist that are capable of depositing viscous materials in a prescribed pattern. Additionally, various systems are known for delivery of viscous materials, liquids and solids based on an overall final mass of product delivered or based on a time-based delivery of a material through some form of nozzle having a controlled flow rate. However, such systems are somewhat deficient as they can result in either a malformed or defective final product are incapable of forming the delivered material in a specified structure. What is needed is a mass-controlled viscous material deposition system, apparatus and method whereby the position of a robotic device is at least partially controlled based on the mass of the deposited material.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an apparatus comprising a robotic control structure having a support structure, said support structure being adapted and configured to be selectively positionable along a prescribed path by said robotic control structure; a viscous material deposition system adapted and configured to control deposition of a viscous material from said viscous material deposition system, and a load sensor associated with said robotic control structure adapted and configured to determine a load of said viscous material supported by said support structure, where a position of said support structure along said prescribed path is controlled at least in part based upon said load. Other embodiments of this aspect can comprise corresponding computer systems, apparatus, and computer programs recorded on one or more computer storage devices, each configured to perform the actions of the methods.

Implementations can include one or more of the following features: the apparatus where said load is an instantaneous load; said position is an instantaneous position; a first load is associated with a first position of said support structure on said prescribed path; said first load is associated with an initial weighpoint; a second load is associated with a second position of said support structure on said prescribed path; and/or said second load is associated with a terminal weighpoint. Implementations of the described techniques can include hardware, a method or process, or computer software on a computer-accessible medium.

Some general aspects comprise a method comprising the steps of providing a robotic control structure having a support structure, said support structure being adapted and configured to be selectively positionable along a prescribed path by said robotic control structure; providing a viscous material deposition system adapted and configured to control deposition of a viscous material from said viscous material deposition system, providing a load sensor associated with said robotic control structure adapted and configured to determine a load of said viscous material supported by said support structure, and positioning said support structure along said prescribed path, where said positioning is controlled at least in part based upon said load. Other embodiments of this embodiment can comprise corresponding computer systems, apparatus, and computer programs recorded on one or more computer storage devices, one or more of each configured to perform the actions of the methods.

Implementations can comprise one or more of the following features: The method where said load is an instantaneous load; said position is an instantaneous position; a first load is associated with a first position of said support structure on said prescribed path, and/or where said first load is associated with an initial weighpoint. Implementations of the described techniques may include hardware, a method or process, or computer software on a computer-accessible medium.

BRIEF DESCRIPTION OF THE DRAWINGS

Further details of the present device are explained with the help of the attached drawings in which.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1:
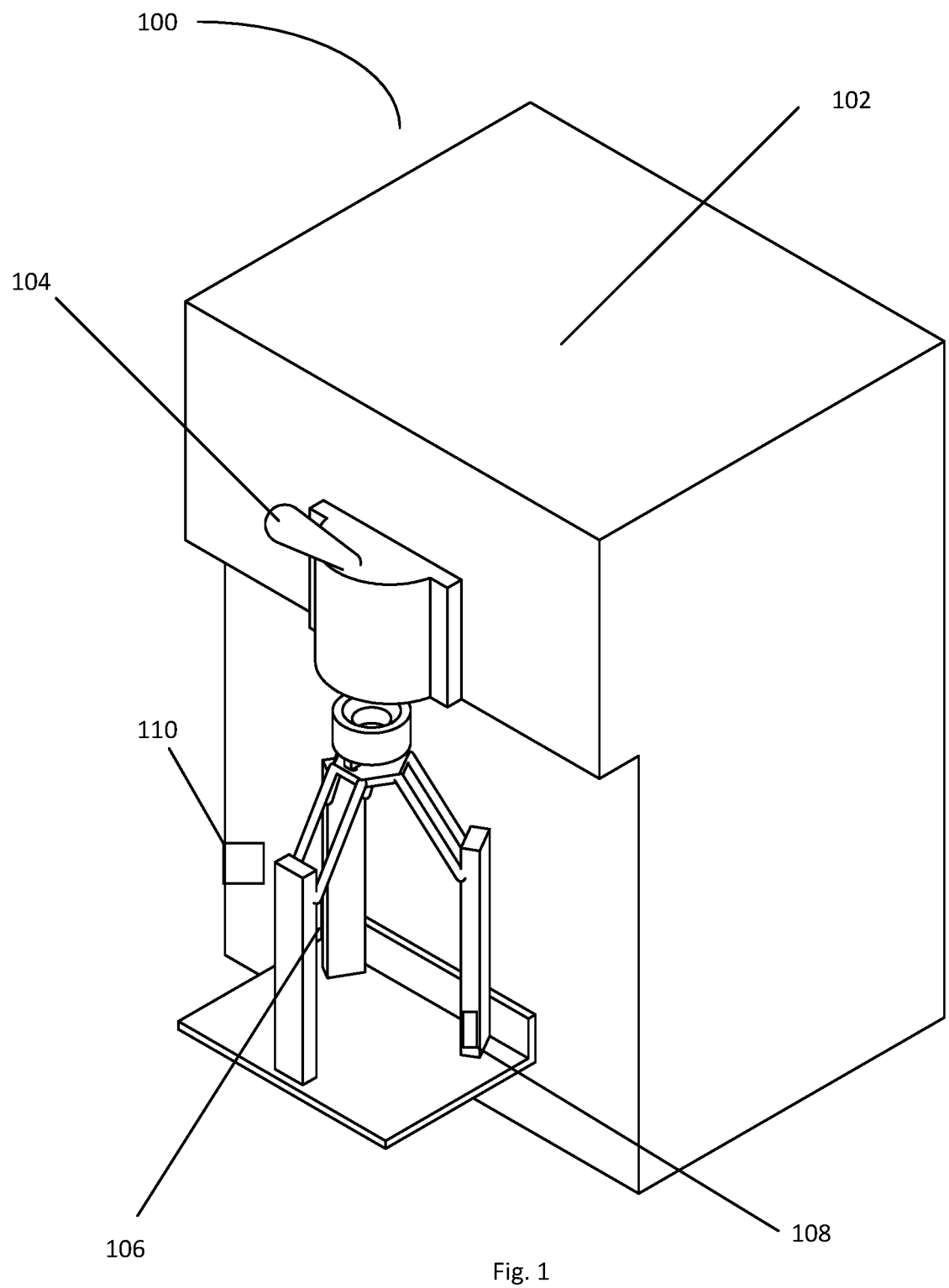
FIG. 1 depicts an overview of a mass-controlled, robotic deposition system for viscous substances.

FIG. 1 depicts an overview of a mass-controlled, robotic deposition system 100 for viscous substances. In the embodiment depicted in FIG. 1, the robotic deposition system 100 can comprise a viscous material deposition apparatus 102, a deposition control lever 104 and a robotic control structure 106. In some embodiments, the viscous material deposition apparatus 102 can be a machine adapted and configured to contain and/or make a viscous, partially- or substantially-frozen dessert, such as soft-serve foodstuffs like frozen yogurt or ice cream. However, in alternate embodiments, the machine can be adapted and configured to contain and/or make any know convenient and/or desired viscous material.

In some embodiments, the deposition control 104 can be system and/or mechanism that selectively controls the rate of flow of the viscous material contained within the viscous material deposition apparatus 102. In some embodiments, the deposition control 104 can include a lever-based system that controls an aperture on the underside of the deposition control 104 and allows selective control of the flow of the viscous material. However, in alternate embodiments, the deposition control 104 can be any known, convenient and/or desired control mechanism and/or system that controls the flow the viscous material in any known, convenient and/or desired manner.

In the embodiment depicted in FIG. 1, the robotic control structure 106 can be configured as a parallel-robot structure adapted and configured to allow for movement of a receptacle, selectively coupled with said robotic control structure 106 relative to the deposition control 104 and/or viscous material deposition apparatus 102. However, in alternate embodiments, the three-legged structure can be substituted with any known convenient and/or desired position controlling system, such as an articulated robot, a cartesian coordinate robot, a cylindrical robot, a polar robot, a SCARA robot and or any other known, convenient and/or desired controlling system and/or apparatus. In some embodiments, the robotic control structure 106 can draw power from the mass-controlled viscous material deposition system 100 and/or can have an independent power supply 108. Additionally, the robotic control structure 106 can be controlled via a controller 110 based on the mass of the viscous substance delivered to the robotic control structure 106.

Figure 2:
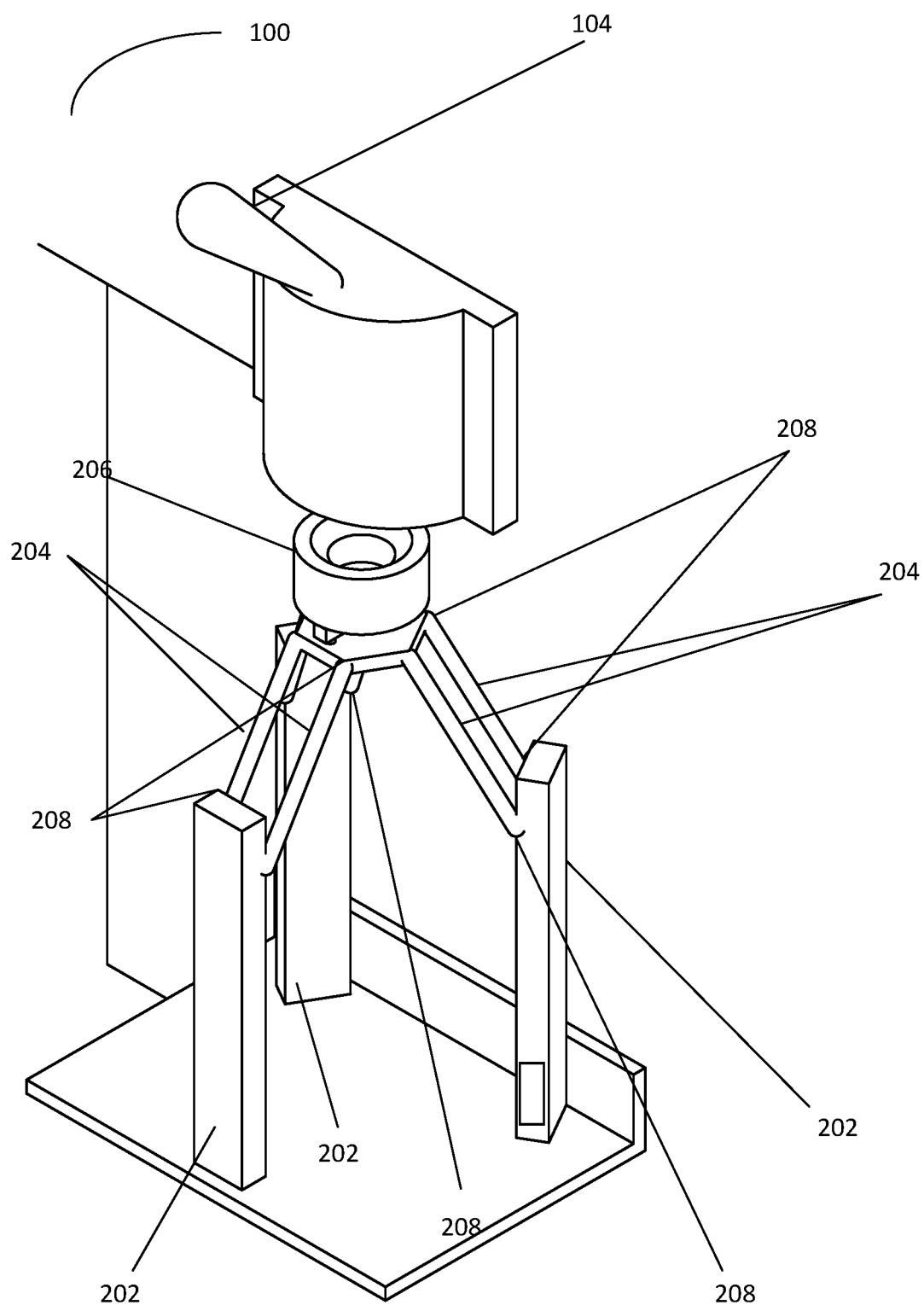
FIG. 2 depicts a magnified view of the mass-controlled, robotic deposition system depicted in FIG. 1

FIG. 2 depicts a magnified view of the mass-controlled, robotic deposition system 100 depicted in FIG. 1. In the embodiment depicted in FIG. 2, the mass-controlled viscous material deposition system 100 can comprise a plurality of supports 202 coupled with a plurality of control arms 204 and a support structure 206. In the embodiment depicted in FIG. 2, the robotic control structure 106 can comprise three supports 202 with each support 202 having two control arms 204 wherein the control arms 204 are coupled with both the support structure 206 and the associated support 202 such that movement of the support structure 206 can be controlled with 6 degrees of freedom—that is in the X-Y, X-Z and Y-Z planes and rotationally around each of the X, Y and Z axes.

In the embodiment depicted in FIG. 2, each of the two control arms 204 associated with each support 202 can be controlled independently and can be coupled with both the associated support 202 and the support structure 206 via a ball socket connection 208, universal joint and/or any other known, convenient and/or desired connection that allows free movement of the ends of each support 202 relative to the support 202 and support structure 206.

In operation, a receptable can be placed in the support structure 206 and can be moved along a controlled path via the robotic control structure 106, based on the mass of the viscous material delivered to the receptacle.

Figure 3:
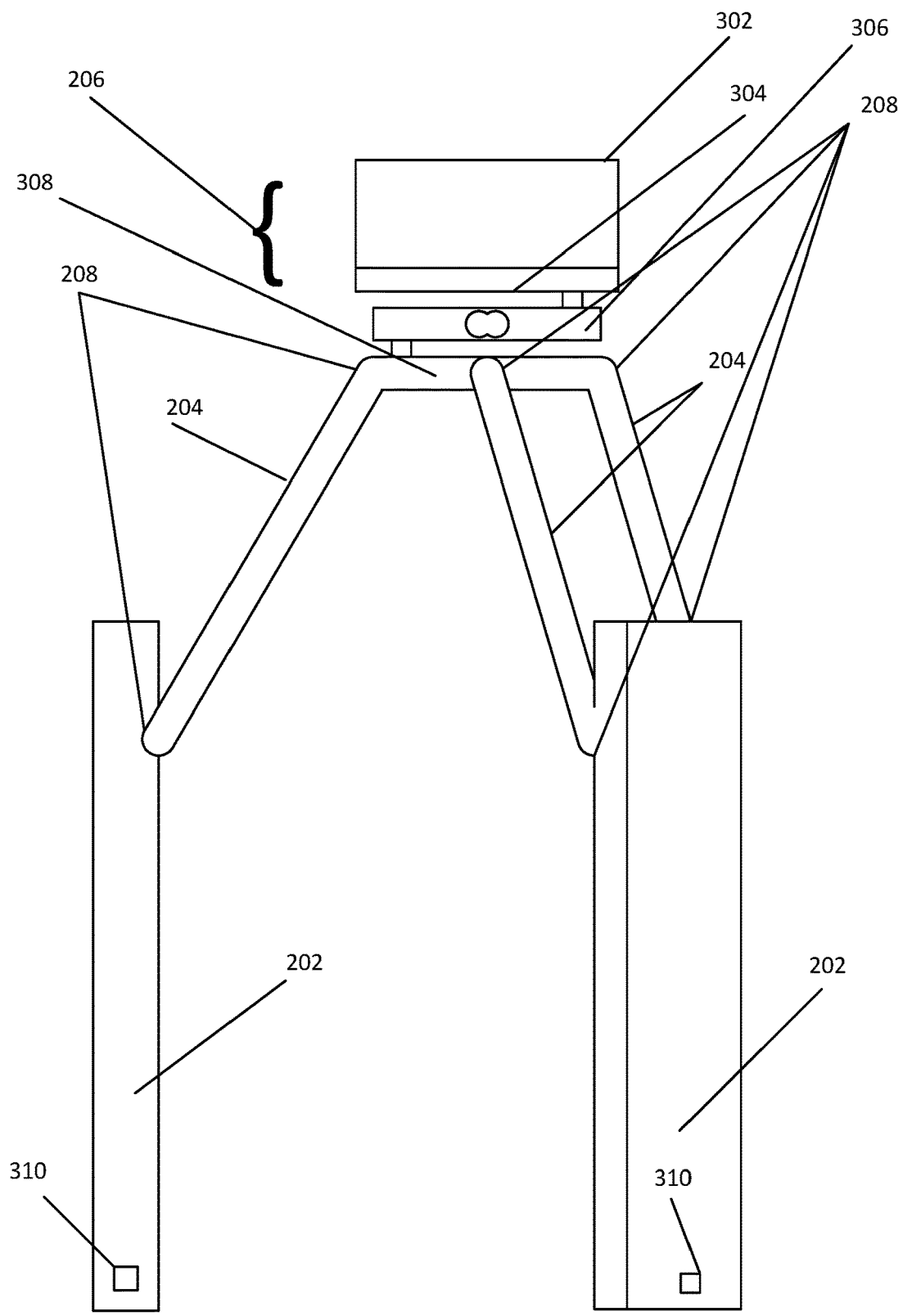
FIG. 3 depicts a close-up view of the mass-controlled, robotic deposition system depicted in FIG. 1.
Figure 4:
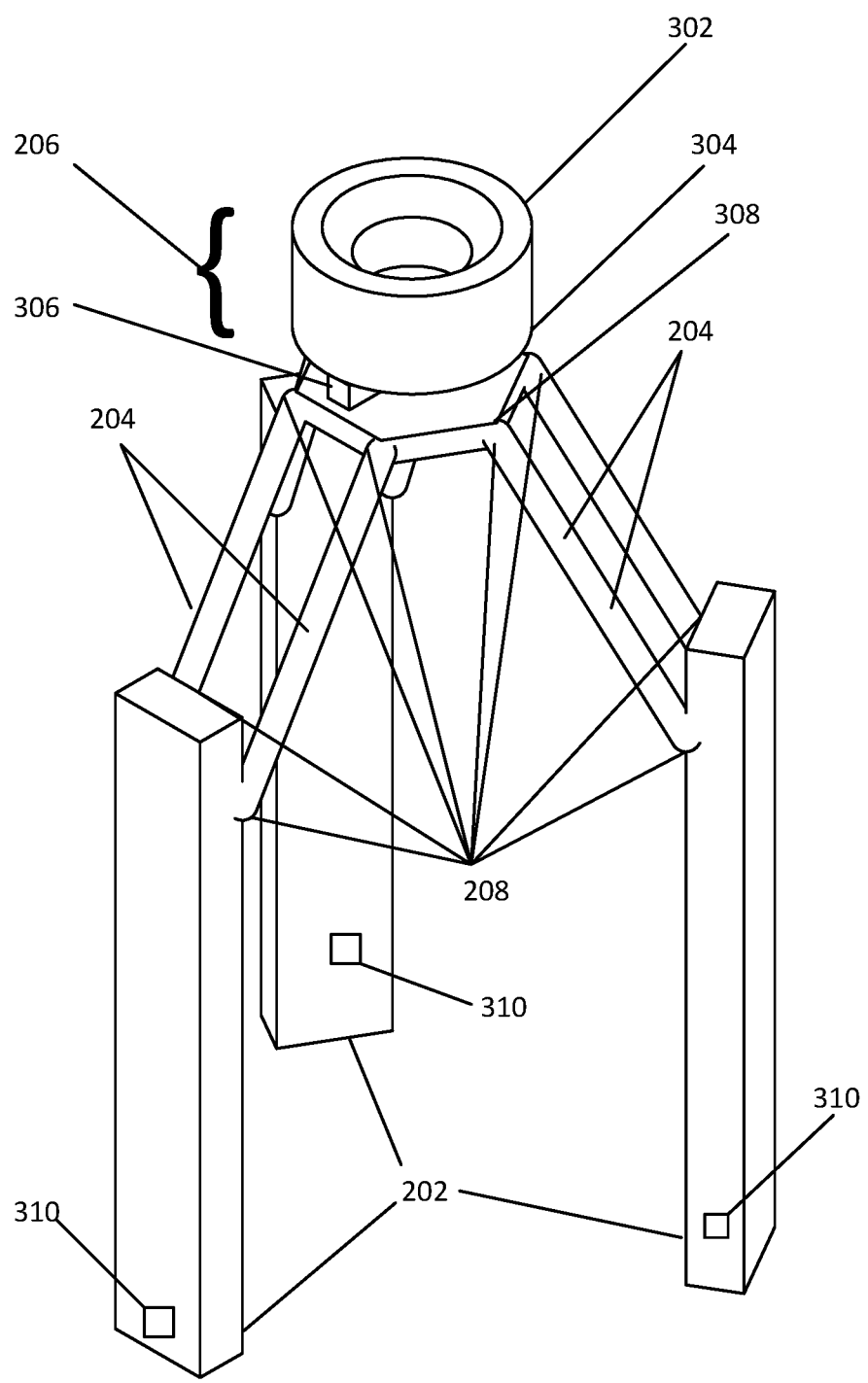
FIG. 4 depicts the robotic assembly of the mass-controlled, robotic deposition system depicted in FIG. 1.

FIGS. 3 and 4 depict a close-up of the mass-controlled, robotic deposition system 100 depicted in FIG. 1 and an isolated view of the robotic control structure 106. In the embodiment depicted in FIG. 3, the mass-controlled viscous material deposition system 100 can comprise a plurality of supports 202 coupled with a plurality of control arms 204 and a support structure 206. In the embodiment depicted in FIG. 3, the robotic control structure 106 can comprise three supports 202 with each support 202 having two control arms 204 wherein the control arms 204 are coupled with both the support platform 308 and the associated support 202 such that movement of the support platform 308 can be controlled with 6 degrees of freedom—that is in the X-Y, X-Z and Y-Z planes and rotationally around each of the X, Y and Z axes. In the embodiment depicted in FIG. 3, each of the two control arms 204 associated with each support 202 can be controlled independently and can be coupled with both the associated support 202 and the support platform 308 via a ball socket connection 208, universal joint and/or any other known, convenient and/or desired connection that allows free movement of the ends of each support 202 relative to the support 202 and the support platform 308.

In the embodiment depicted in FIGS. 3 and 4, the support structure 206 can comprise a receptacle holder 302, a base 304 and a load sensor 306 supported on the support platform 308. In operation, the load sensor 306 can determine the instantaneous mass or weight supported by the support structure 206 and any changes in mass supported by the/ support structure 206. The load sensor 306 can be in electrical communication with the independent power supply 108 and controller 110 which can control motors 310 based on the mass detected by the load sensor 306 such that the support structure 206 proceeds along a predefined path that comprises a plurality of weigh points associated with detected mass values. In some embodiments, the controller 110 can be in electrical communication with the viscous material deposition apparatus 102 such that when a detected mass reaches or exceeds a predefined value the viscous material deposition apparatus 102 can be automatically shut off such that no further viscous material is delivered to the receptacle in the support structure 206. Additionally, all components of the mass-controlled robotic deposition system 100 can be in electrical communication with the independent power supply 108 and/or any other known, convenient and/or desired power source.

In some embodiments, one or more load sensors 306 can be positioned below the robotic control structure 106 or within the platform 308 to determine the mass of viscous material deposited. In still further alternate embodiments, mass delivered to the receptacle can be determined based upon monitoring of changes in energy requirements to operate and/or feedback from one or more motors 110 which can change as the mass supported by the one ore more motors changes.

Figure 5:
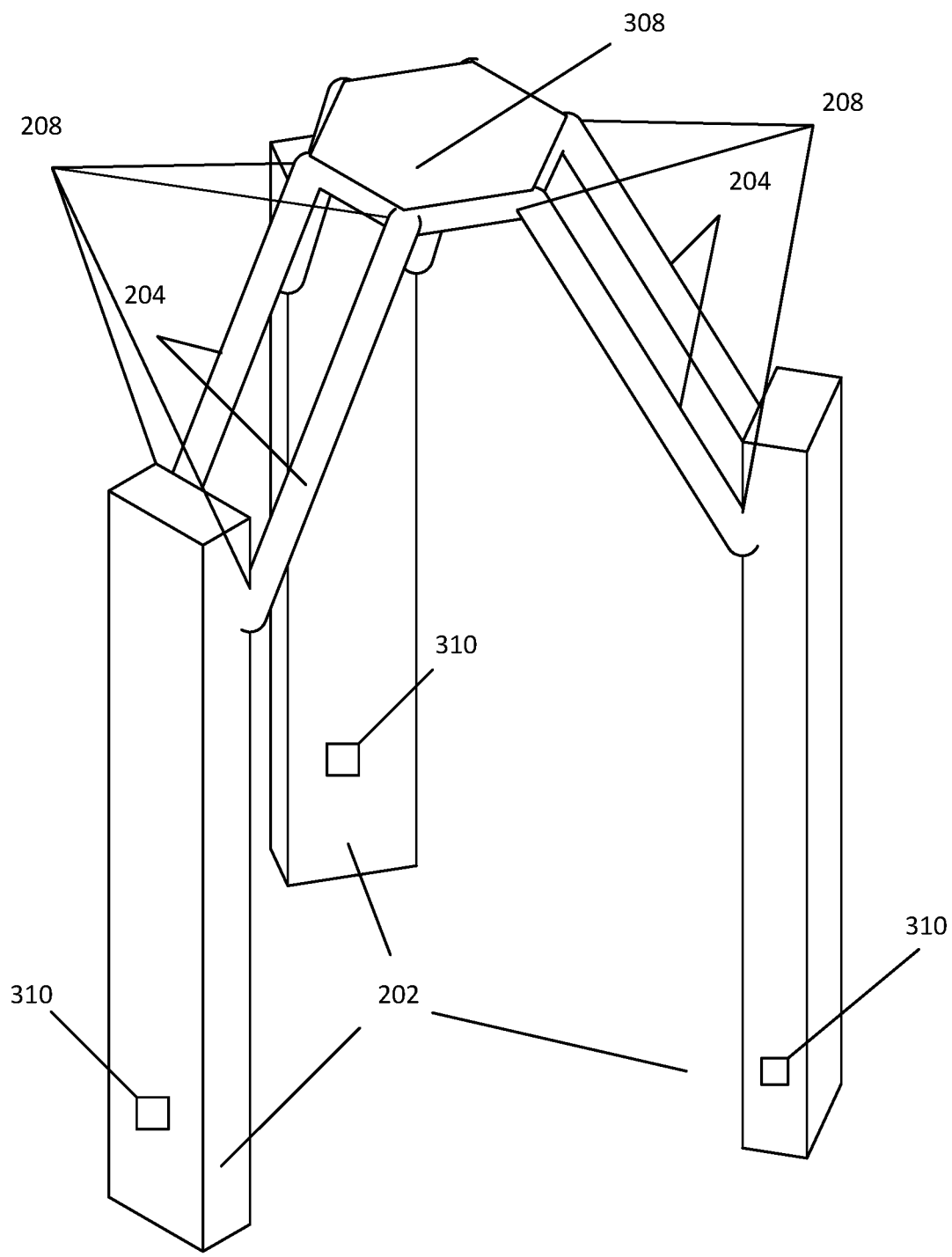
FIG. 5 depicts a form of the robotic assembly of the mass-controlled, robotic deposition system depicted in FIG. 1.

FIG. 5 depicts a form of the robotic assembly of the mass-controlled, robotic deposition system 100 depicted in FIG. 1 absent the receptacle holder 302, base 304 and load sensor 306, to more clearly depict the connection between the control arms 204 and the support platform 308. In the embodiment depicted in FIG. 5, the support platform 308 is depicted as having a hexagonal shape. However, in alternate embodiments, the support platform 308 can have any known convenient and/or desired shape and can be coupled with the control arms 204 at any known, convenient and/or desired connection points.

Figure 6:
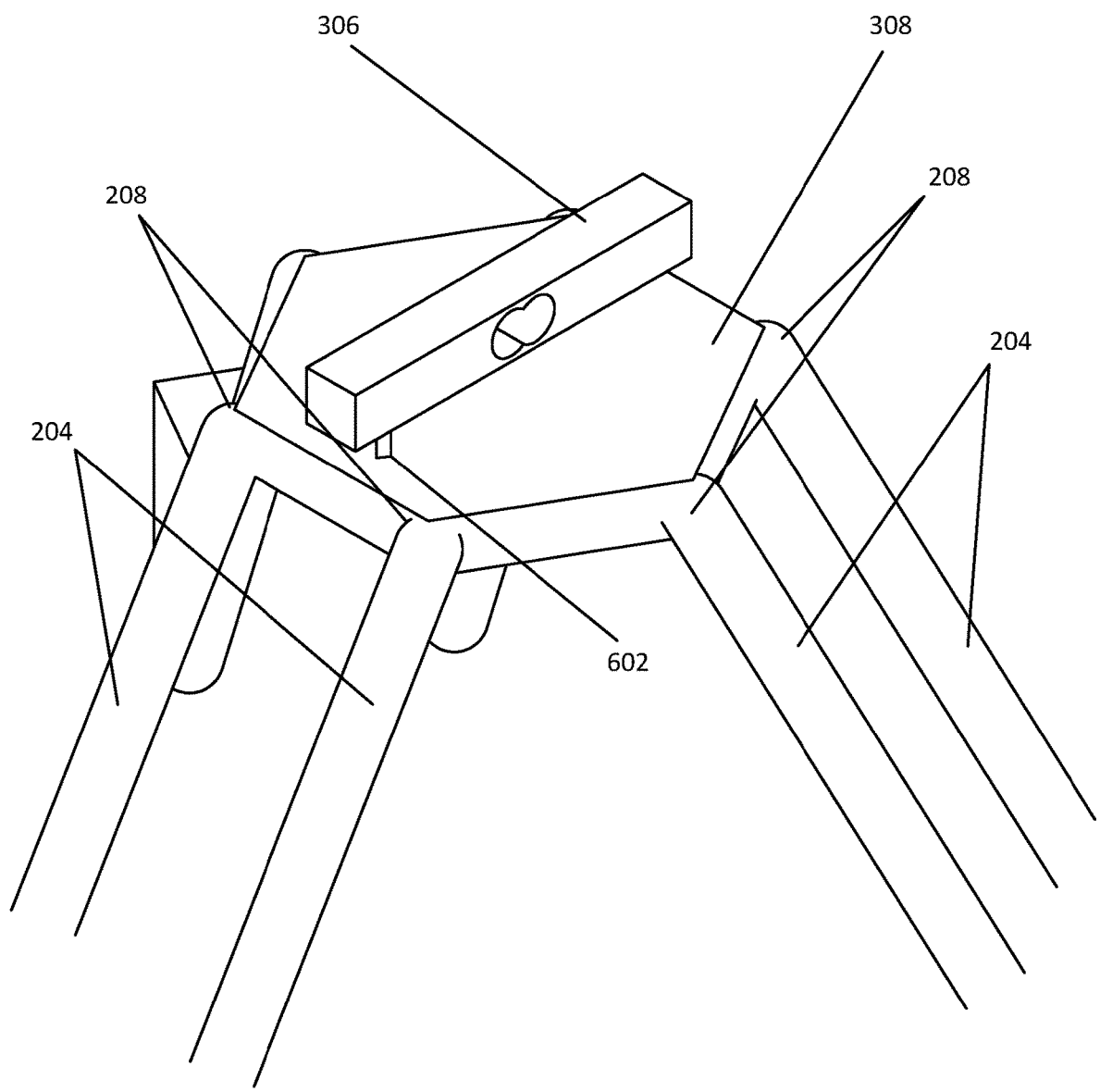
FIG. 6 depicts a magnified view of components of the robotic assembly of the mass-controlled, robotic deposition system depicted in FIG. 1.

FIG. 6 depicts a magnified view of components of the robotic assembly of the mass-controlled, robotic deposition system 100 depicted in FIG. 1, absent the receptacle holder 302 and base 304. In the embodiment depicted in FIG. 6, the load sensor 306 can be coupled with the support platform 308 via a coupling 602. In some embodiments the load sensor 306 can pivot and/or be pivotally controlled via a motor 310 and the controller 110 relative to the support platform 308 In alternative embodiments, the load sensor 306 can be in a fixed position relative to the support platform 308.

Figure 7:
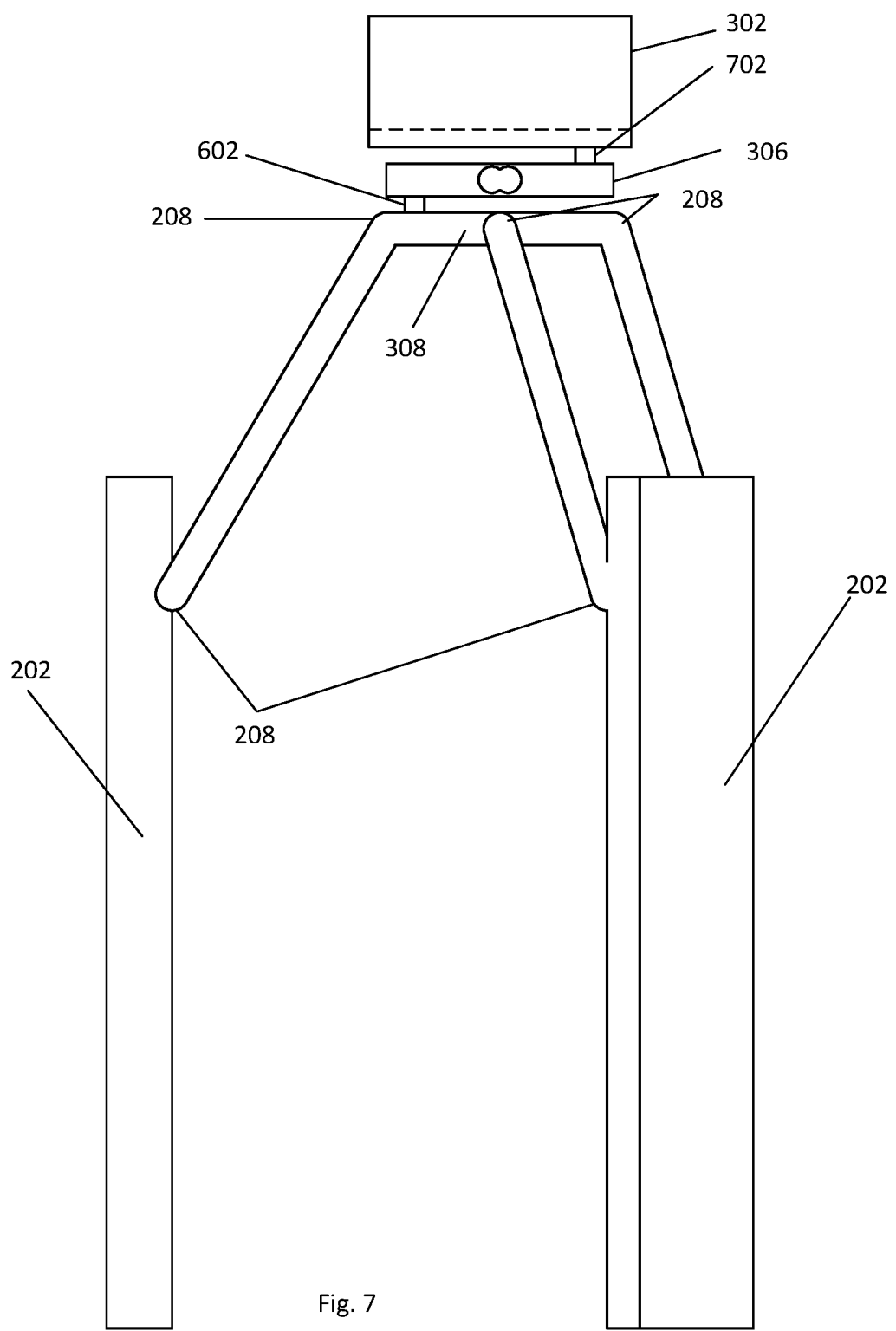
FIG. 7 depicts a magnified view of components of the robotic assembly of the mass-controlled, robotic deposition system depicted in FIG. 1.

FIG. 7 depicts a magnified view of components of the robotic assembly of the mass-controlled, robotic deposition system 100 depicted in FIG. 1, absent the receptacle holder 302. In the embodiment depicted in FIG. 7, the load sensor 306 can be coupled with the support platform 308 via a coupling 602 and the base 304 can be coupled with the load sensor 306 via a second coupling 702. In some embodiments the load sensor 306 can pivot and/or be pivotally controlled via a motor 310 and the controller 110 relative to the support platform 308 and/or the base 304 In alternative embodiments, the load sensor 306 can be in a fixed position relative to the support platform 308 and/or base 304.

Figure 8:
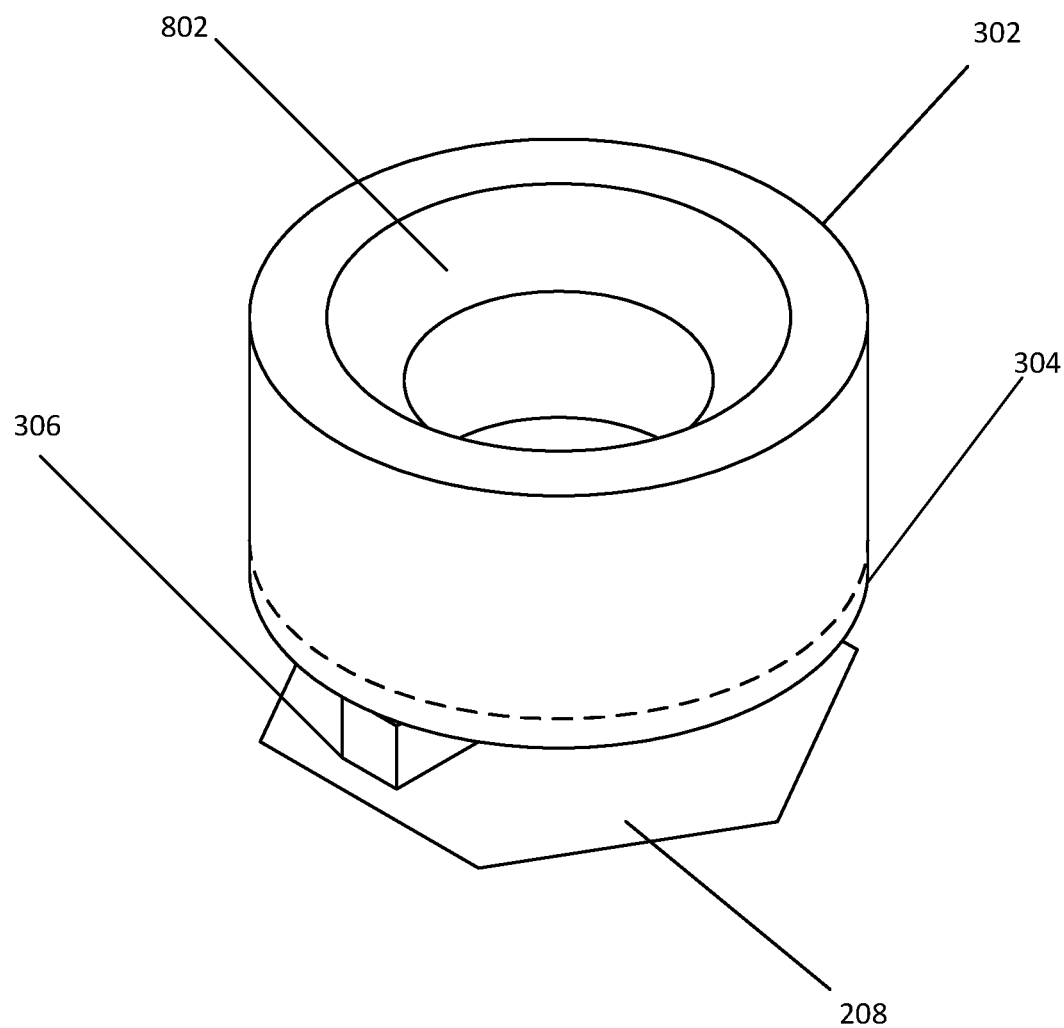
FIG. 8 depicts a magnified view of components of the robotic assembly of the mass-controlled, robotic deposition system depicted in FIG. 1.

FIG. 8 depicts a magnified view of components of the robotic assembly of the mass-controlled, robotic deposition system 100 depicted in FIG. 1. In the embodiment depicted in FIG. 8, the load sensor 306 can be coupled with the support platform 308 via a coupling 602 and the base 304 can be coupled with the load sensor 306 via a second coupling 702. In some embodiments the load sensor 306 can pivot and/or be pivotally controlled via a motor 310 and the controller 110 relative to the support platform 308 and/or the base 304 In alternative embodiments, the load sensor 306 can be in a fixed position relative to the support platform 308 and/or base 304.

In the embodiment depicted in FIG. 8, the receptacle holder 302 can comprise an anchor recess 802 adapted and configured to contain a receptacle (not shown). In the embodiment depicted in FIG. 8, the anchor recess 802 can be adapted and configured to selectively and releasably mate with an ice cream cone. However, in alternate embodiments, the anchor recess 802 can be adapted and configured to selectively and releasably mate with any known convenient and/or desired receptacle (not shown).

Figure 9A:
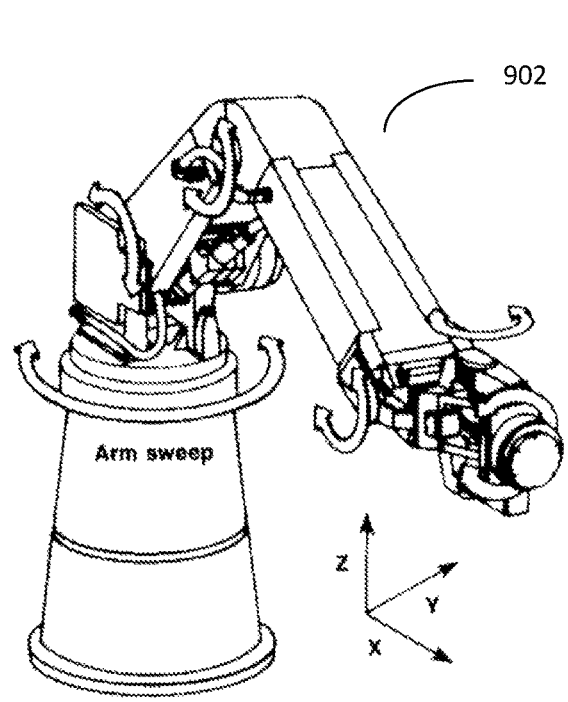
FIGS. 9a-9h depict alternate embodiments of the robotic assembly of the mass-controlled robotic deposition system depicted in FIG. 1
Figure 9B:
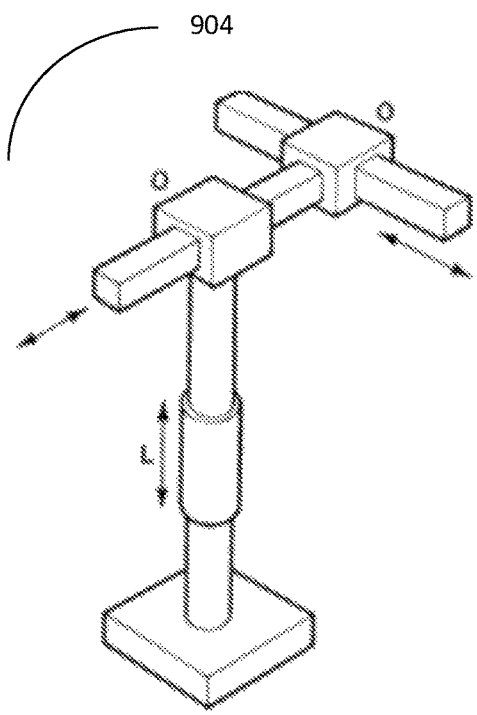
Figure 9C:
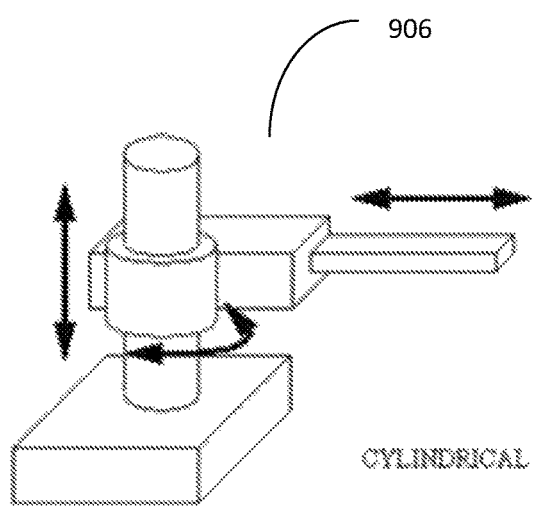
Figure 9D:
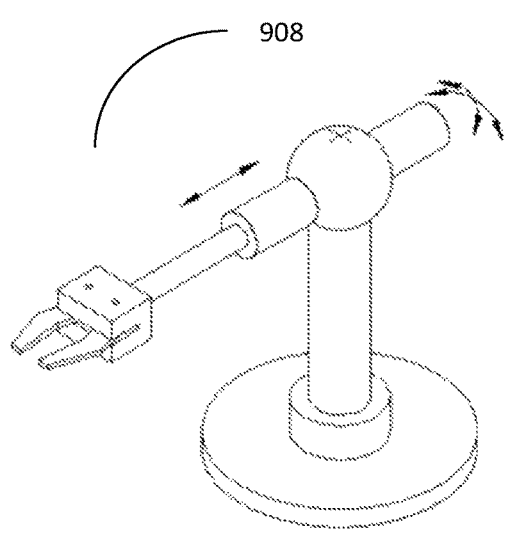
Figure 9E:
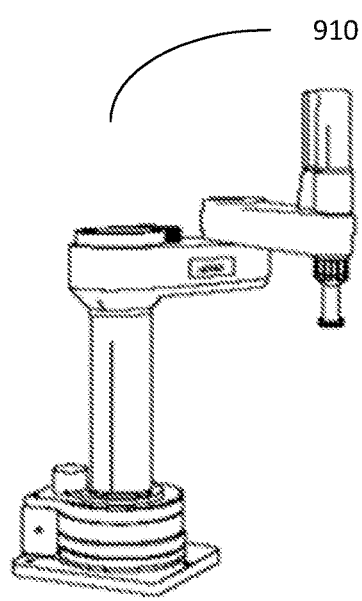

FIGS. 9a-9h depict alternate embodiments of the robotic control structure 106 of the mass-controlled robotic deposition system 100 depicted in FIG. 1. FIG. 9a depicts an embodiment of an articulated robot 902 which can be used as the robotic control structure 106. FIG. 9b depicts an embodiment of a cartesian coordinate robot 904 which can be used as the robotic control structure 106. FIG. 9c depicts an embodiment of a cylindrical robot 906 which can be used as the robotic control structure 106. FIG. 9d depicts an embodiment of a polar robot 908 which can be used as the robotic control structure 106. FIG. 9e depicts an embodiment of a Selective Compliance Assembly Robot Arm (SCARA) 910 which can be used as the robotic control structure 106.

Figure 9F:
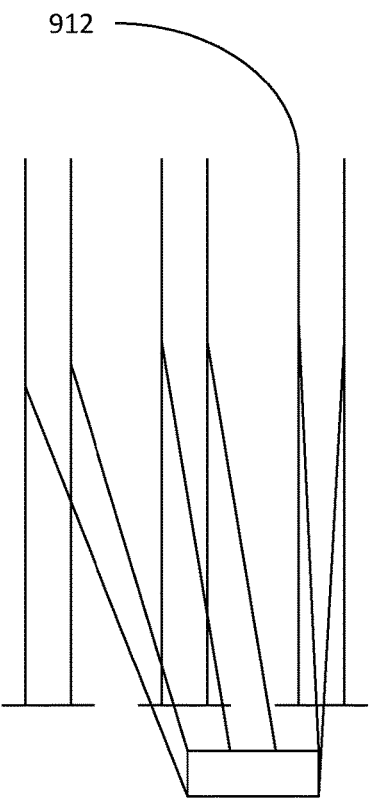

FIG. 9f depicts an embodiment of an alternate robotic structure which can be used as the robotic control structure 106 in which a support platform 308 can be controlled via control arms 204 coupled with supports 202.

Figure 9G:
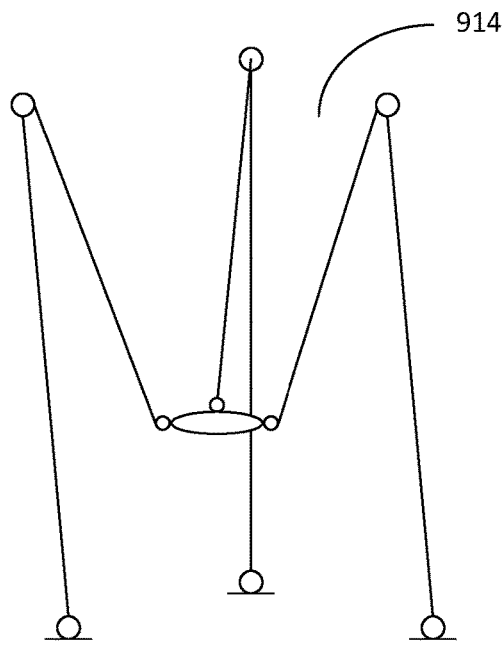

FIG. 9g depicts an embodiment of an alternate robotic structure which can be used as the robotic control structure 106 in which a support platform 308 can be controlled via pivotally coupled control arms 204.

Figure 9H:
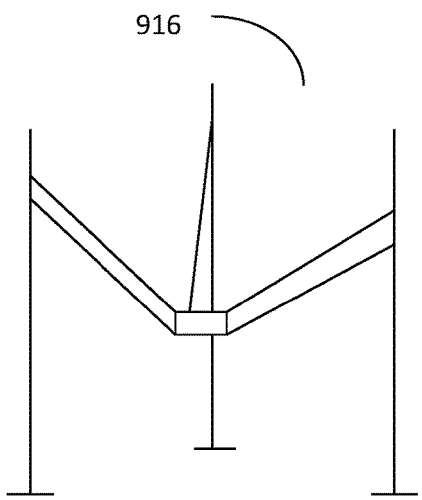

FIG. 9h depicts an embodiment of an alternate robotic structure which can be used as the robotic control structure 106 in which a support platform 308 can be controlled via control arms 204 coupled with supports 202.

Figure 10:
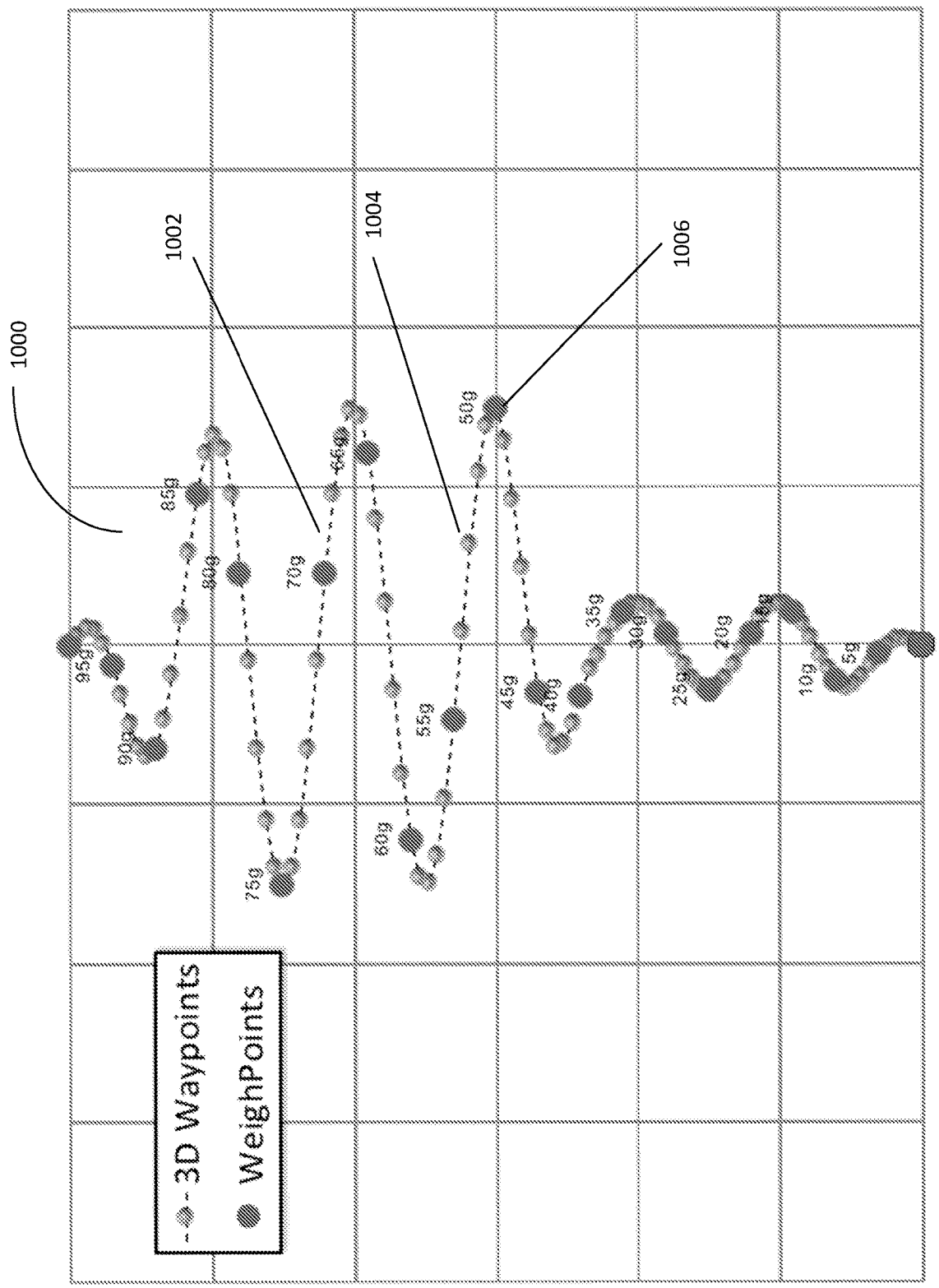
FIG. 10 depicts 2-dimensional representation of an exemplary embodiment of a 3-dimensional, mass-based, path for use with the robotic assembly.

FIG. 10 depicts 2-dimensional representation 1000 of an exemplary embodiment of a 3-dimensional, mass-based, path 1002 for use with the robotic assembly. In the embodiment depicted in FIG. 10, the path is depicted as a variable radius helical-type path. However, in alternate embodiments the path 1002 can follow any known, convenient and/or desired, continuous and/or disjointed path 1002. In the embodiment depicted in FIG. 10, the path 1002 can be comprised and/or defined by waypoints 1004 and weighpoints 1006. The waypoints 1004 define intervals along the path 1002 to represent the overall path 1002 in interval steps and the weighpoints 1006 define points along the path 1002 associated with weights measured by the load sensor 306. In operation, the/robotic control structure 106, the support platform 308 and/or the receptacle holder 302 can be moved along the path 1002 via the motors 110 via the controller 108 and the position of the robotic control structure 106, support platform 308 and/or receptacle holder 302 along the path 1002 can be controlled by the mass detected by the load sensor 306. By way of non-limiting example and as depicted in FIG. 10, when the sensed weight of delivered viscous material is 0 g, the robotic control structure 106, support platform 308 and/or receptacle holder 302 can be in a first position, as depicted by element number 1010 and as viscous material is delivered to the robotic control structure 106 and/or receptacle, the robotic control structure 106 can be moved though waypoints to the next weighpoint 1012 as the load sensor 306 registers 5 g. As viscous material is further delivered, the mass registered by the load sensor 306 increases, the robotic control structure 106 can further advance along the path 1002 via the waypoints 1006 until the mass registers 15 g at which point the robotic control structure 106 will be positioned along the path at the point 1014. Then as the mass of viscous material further increases the position of the robotic control structure 106, support platform 308 and/or receptacle holder 302 can transition along the path 1002 via the waypoints 1004 to reach the weighpoint 1006 associated with a prescribed mass, such as point 1016, associated with 35 g. In such a system, the position along the path 1002 is associated with the mass of the viscous material delivered.

In some embodiments the load sensor 306 can have a tare function such that the load sensor 306 can be reset to a desired value (such as zero) despite the fact that weight sensor is actually supported a mass.

Figure 11:
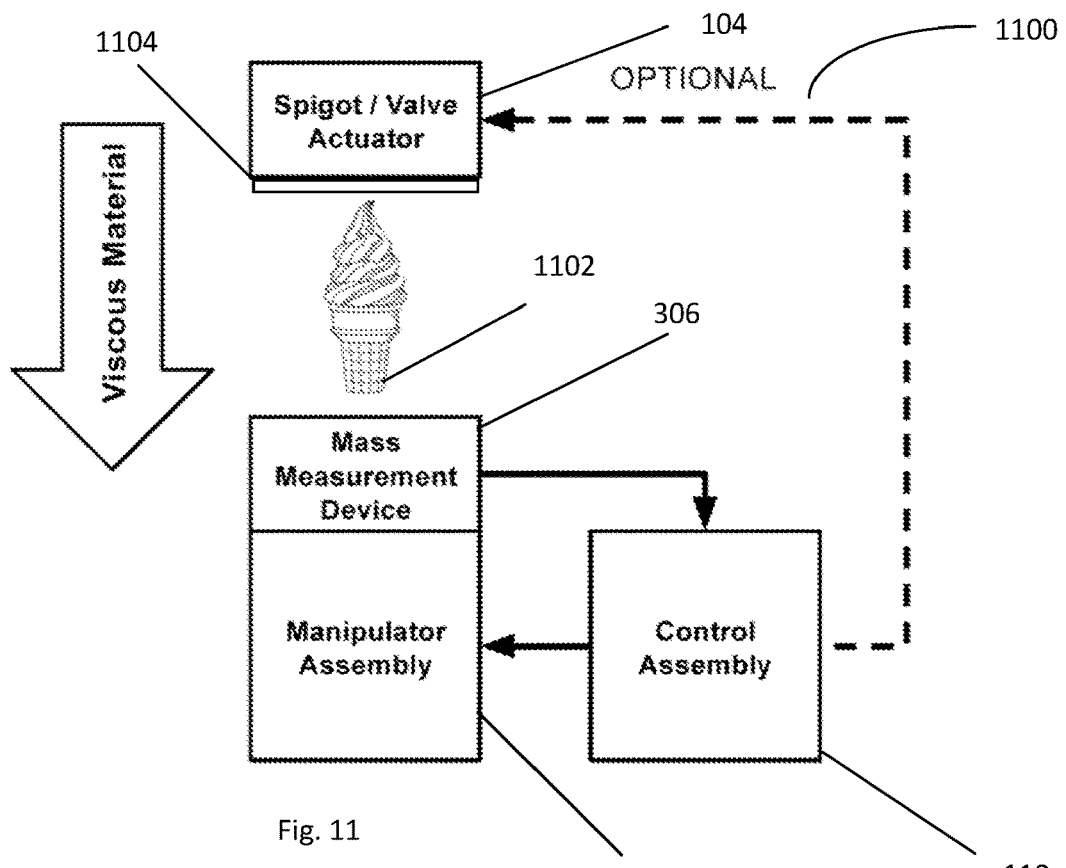
FIG. 11 depicts an embodiment of the mass-controlled, robotic deposition system.
Figure 12:
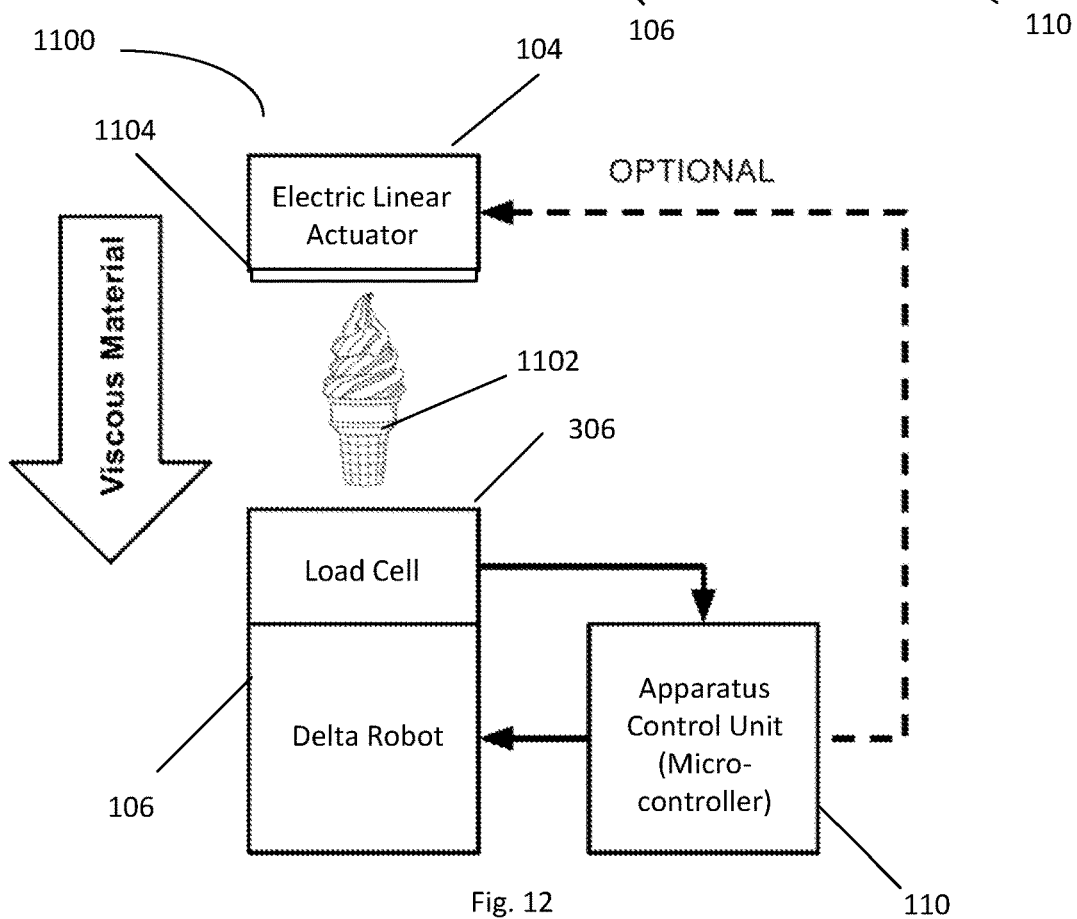
FIG. 12 depicts an expanded view of the mass-controlled, robotic deposition system.

FIGS. 11 and 12 depict an embodiment 1100 of the mass-controlled, robotic deposition system 100. In the embodiment depicted in FIGS. 11 and 12, a receptable 1102 can be inserted in the system 100 in association with the load sensor 306 supported by the robotic control structure 106 A controller 110 can be in electrical communication with load sensor 306 and the robotic control structure 106 and motors 110. A deposition control lever 104 can control the deposition of viscous material (such as ice cream or frozen yogurt and/or any known convenient and/or desired material) to the receptacle 1102, increasing the mass supported by the load sensor 306. The mass detected by the load sensor 306 being delivered to the controller 110 and the controller 110 moving the robotic control structure 106 in response to the mass detected and the prescribed weight-based path, such as described in relation to FIG. 10. In some embodiments, the load sensor 306 can be substituted or augmented with a flow sensor 1104 associated with the viscous material deposition apparatus 102 such that the mass of viscous material passing from the viscous material deposition apparatus 102 can be measured to determine the mass of the viscous material delivered to the receptacle 1102. In further embodiments, one or more load sensors can be positioned below the robotic control structure 106 to determine the mass of viscous material deposited. In still further alternate embodiments, mass delivered to the receptacle can be determined based upon monitoring of changes in energy requirements to operated one or more motors 110 which can change as the mass supported changes.

Figure 13A:
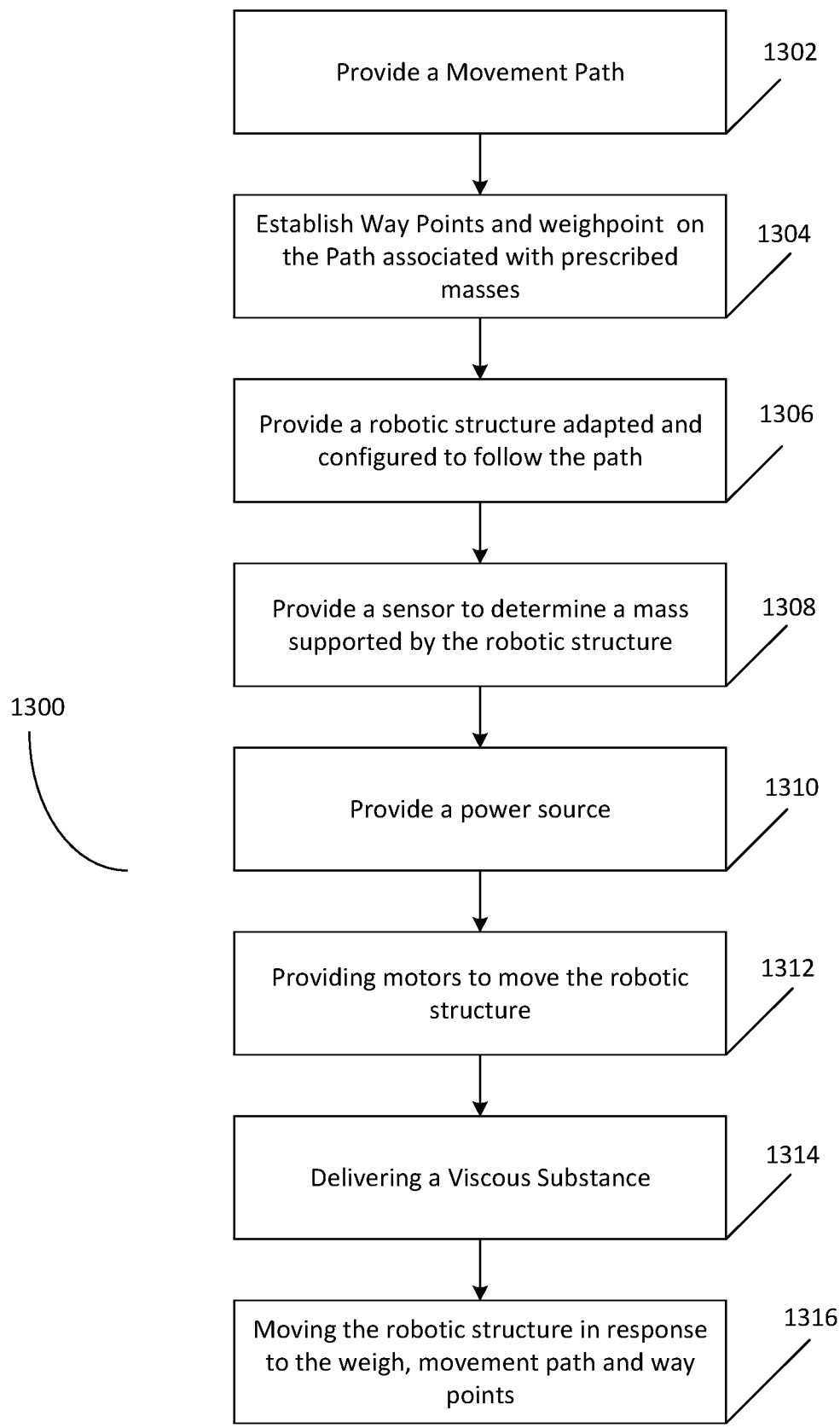
FIGS. 13a and 13b depict embodiments of methods of mass-controlled, robotic deposition of viscous material.

FIG. 13a depicts an embodiment of a method of mass-controlled, robotic deposition of viscous material 1300. In step 1302 a movement path 1002 is provided and then in step 1304, waypoint 1004 and weighpoints 1006 along the path are defined and the weighpoints 1006 are associated with prescribed masses. A robotic control structure 106 adapted and configured such that it is capable of following the prescribed path 1002 is provided in step 1306. A load sensor 306 is associated with the robotic control structure 106 in step 1308 and the system is provided with power in step 1310 and motors 310 adapted and motors 310 are provided to move the robotic control structure are provided in step 1312. In step 1314 a viscous material is delivered to the robotic control structure 106 and in step 1316 the robotic control structure 106 is moved along the path 1002 between weighpoints 1006 via waypoints 1004.

Figure 13B:
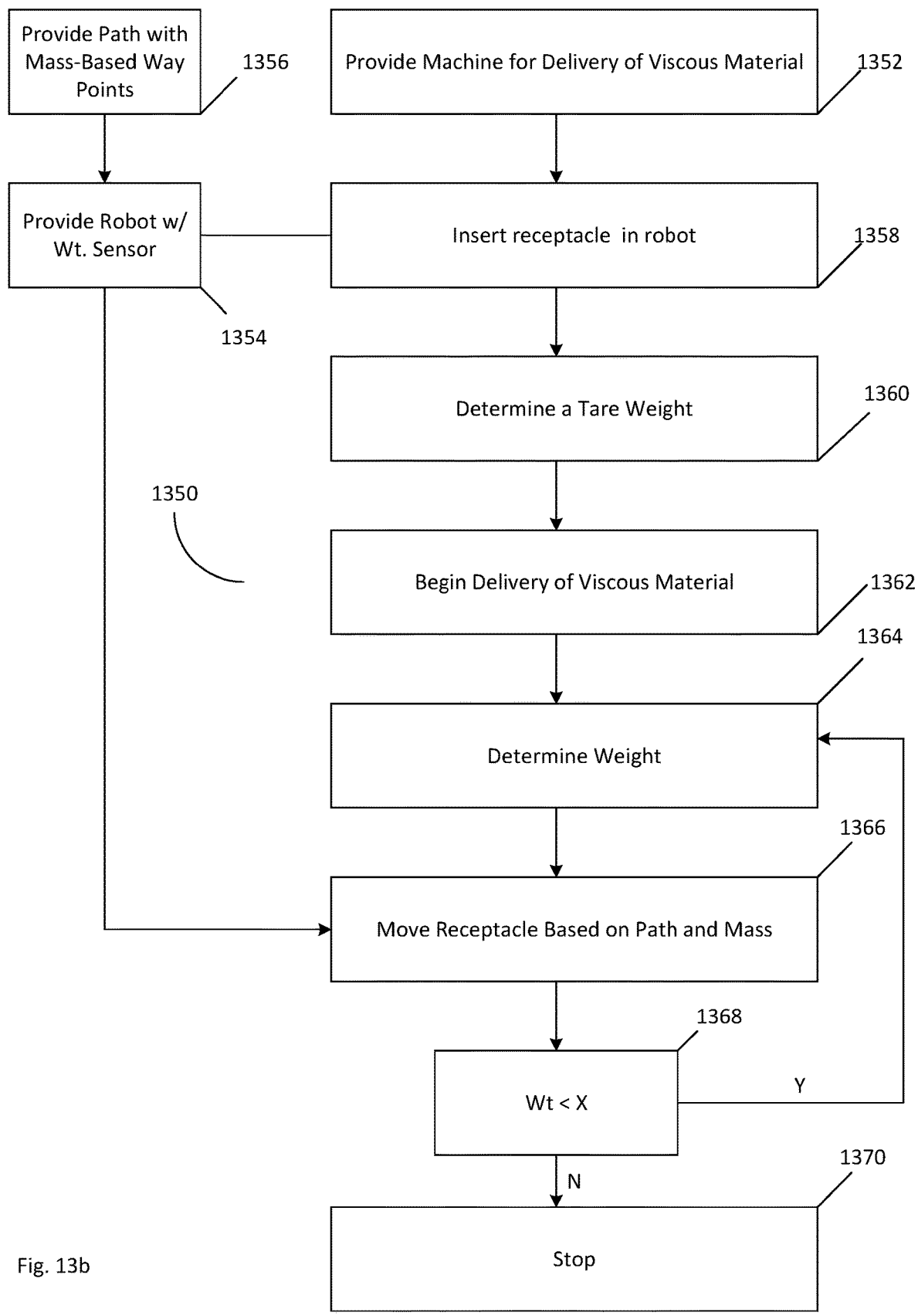

FIG. 13b depicts an embodiment of a method of mass-controlled, robotic deposition of viscous material 1350. In step 1352, a machine for deposition of a viscous material is provided and in step 1354 a robotic control structure 106 associated with a load sensor 306 is provided and in step 1356 a mass-controlled path 1002 is defined based upon waypoints 1004 and at least two weighpoints 1006, such as a start weighpoint 1006 and an end weighpoint 1006. In step 1358 a receptable 1102 is associated with the robotic control structure 106 and in step 1360 a tare weight can be determined prior to commencement of deposition of a viscous material to the receptable 1102 in step 1362. In step 1364 a mass is determined via the load sensor 306 and then the robotic control structure 106 can be moved in step 1366 in response to the mass determined in step 1364. In some embodiments, in step 1368 if the mass registered is less than a prescribed mass (x), then method 1350 can proceed to step 1364 and a mass can be determined and the robotic control structure 106 can be moved in response to the new mass determined in step 1366 and the mass can then be evaluated again in step 1368. If in step 1368 the mass is determined to be equal or greater than a prescribed mass (x), then the system can stop moving the robotic control structure 106 and/or deposition of the viscous material can be stopped.

In some alternate embodiments of FIGS. 13a-13b, deposition of the viscous material can be configured at a known and/or controlled rate—by way of non-limiting example at a rate of x grams per centimeter of material. Moreover, in some embodiments, the rate can vary in a known, convenient and/or desired manner. In such embodiments wherein a flowrate is known and/or prescribed and a movement path 1002 is known, the robotic deposition system 100 can operate and the robotic control structure 106 can proceed along the movement path 1002 based up a predicted or estimated mass based upon a period of time and the known flow rate, such as grams/second, or grams/centimeter coupled with a known flow rate, such as x centimeters per second. Thus, in some embodiments, the robotic deposition system 100 can operate using the movement path 1002, an initial mass detected by the load sensor 306 and an end mass at which deposition of the viscous material will cease. Moreover, in some embodiments, the flow rate of the viscous material can be varied in a known manner and movement and/or velocity of the receptacle holder 302 along the movement path 1002 can be varied based on a known/detected mass and/or predicted mass.

Figure 14:
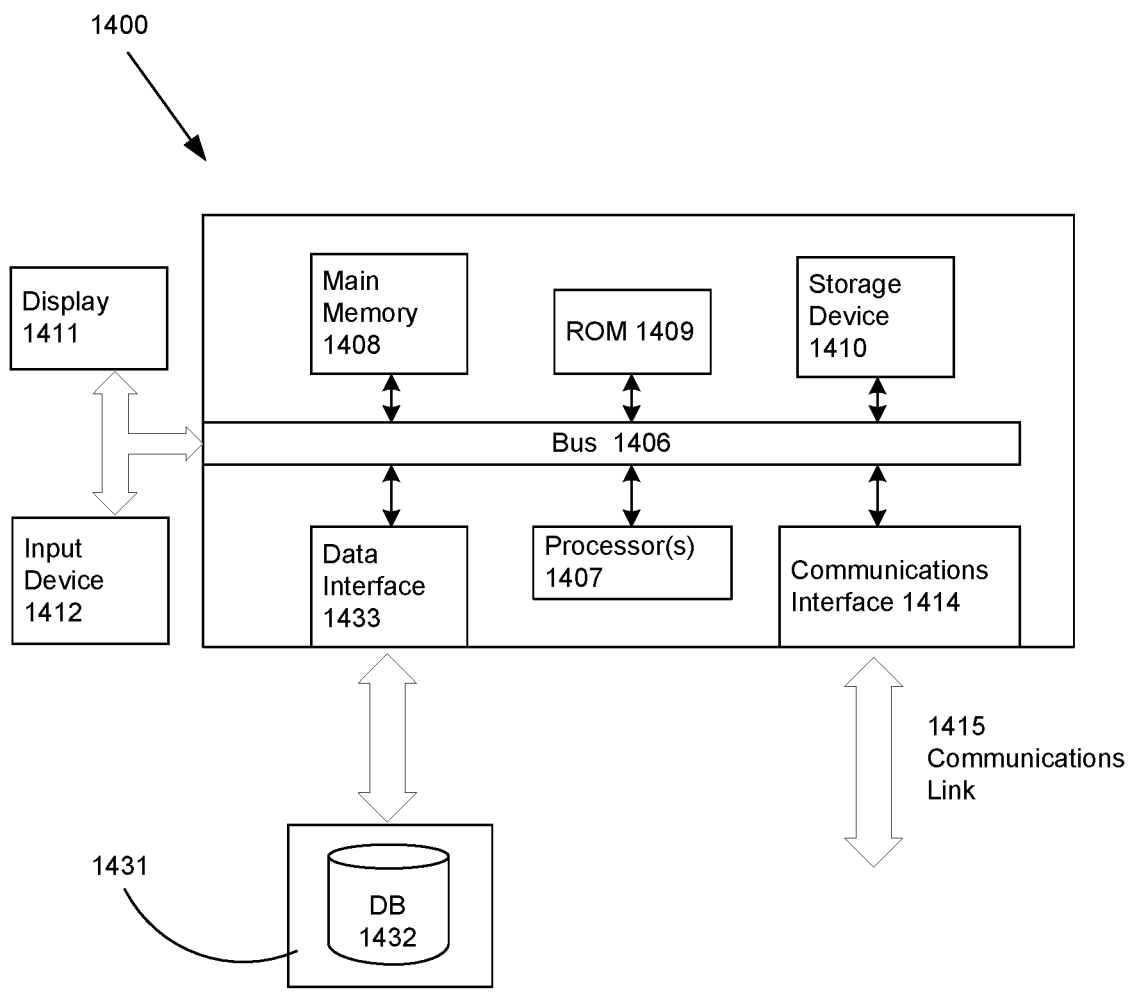
FIG. 14 depicts an exemplary embodiment of a computer and control system.

The execution of the sequences of instructions required to practice the embodiments can be performed by a computer system 1400 as shown in FIG. 14. In an embodiment, execution of the sequences of instructions is performed by a single computer system 1400. According to other embodiments, two or more computer systems 1400 coupled by a communication link 1415 can perform the sequence of instructions in coordination with one another. Although a description of only one computer system 1400 will be presented below, however, it should be understood that any number of computer systems 1400 can be employed to practice the embodiments.

A computer system 1400 according to an embodiment will now be described with reference to FIG. 14, which is a block diagram of the functional components of a computer system 1400. As used herein, the term computer system 1400 is broadly used to describe any computing device that can store and independently run one or more programs.

Each computer system 1400 can include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 can be a LAN, in which case the communication interface 1414 can be a LAN card, or the communication link 1415 can be a PSTN, in which case the communication interface 1414 can be an integrated services digital network (ISDN) card or a modem, or the communication link 1415 can be the Internet, in which case the communication interface 1414 can be a dial-up, cable or wireless modem.

A computer system 1400 can transmit and receive messages, data, and instructions, including program, i.e., application, code, through its respective communication link 1415 and communication interface 1414. Received program code can be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 can be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also can be used for storing temporary data, i.e., variables, or other intermediate information during execution of instructions by the processor(s) 1407.

The computer system 1400 can further include a read only memory (ROM) 1409 or other static storage device coupled to the bus 1406 for storing static data and instructions for the processor(s) 1407. A storage device 1410, such as a magnetic disk or optical disk, can also be provided and coupled to the bus 1406 for storing data and instructions for the processor(s) 1407.

A computer system 1400 can be coupled via the bus 1406 to a display device 1411, such as, but not limited to, a cathode ray tube (CRT) or a liquid-crystal display (LCD) monitor, for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions can be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium can take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. An apparatus comprising:
a robotic control structure having a support structure, said support structure being adapted and configured to be selectively positionable along a prescribed path by said robotic control structure and further comprising a receptacle holder, a base, and a load sensor positioned on a support platform;
a viscous material deposition system adapted and configured to control deposition of a viscous material from said viscous material deposition system; and
a said load sensor associated with said robotic control structure adapted and configured to determine a load of said viscous material supported by said support structure;
wherein a position of said support structure along said prescribed path is controlled at least in part based upon said load; and
wherein an initial position is based on an initial load, a second position is based on a predetermined final load, and a plurality of intermediate predetermined positions are based on an associated plurality of intermediate loads. wherein said positions are time agnostic.

2. The apparatus of claim 1 wherein said load is an instantaneous load.

3. The apparatus of claim 2, wherein said position is an instantaneous position.

4. The apparatus of claim 3, wherein said load is a mass.

5. The apparatus of claim 1, wherein said position is an instantaneous position.

6. The apparatus of claim 5, wherein said load is a mass.

7. The apparatus of claim 1, wherein said initial load is associated with an initial weighpoint.

8. The apparatus of claim 1, wherein said predetermined final load is associated with a terminal weighpoint.

9. The apparatus of claim 8, wherein a third load is associated with a third position of said support structure on said prescribed path between said initial position and said second position.

10. The apparatus of claim 9, wherein said third position is associated with an intermediate weighpoint.

11. A method comprising:
providing a robotic control structure having a support structure, said support structure being adapted and configured to be selectively positionable along a prescribed path by said robotic control structure;
providing a viscous material deposition system adapted and configured to control deposition of a viscous material from said viscous material deposition system;
providing a load sensor associated with said robotic control structure and further comprising a receptacle holder, a base, and a load sensor positioned on a support platform adapted and configured to determine a load of said viscous material supported by said support structure; and
positioning said support structure along said prescribed path;
wherein said positioning is controlled at least in part based upon said load; and
wherein an initial position is based on an initial load, a second position is based on a predetermined final load, and a plurality of intermediate predetermined positions are based on an associated plurality of intermediate loads, wherein said positions are time agnostic.

12. The method of claim 11 wherein said load is an instantaneous load.

13. The method of claim 12, wherein said position is an instantaneous position.

14. The method of claim 13, wherein said load is a mass.

15. The method of claim 11, wherein said position is an instantaneous position.

16. The method of claim 15, wherein said load is a mass.

17. The method of claim 11:
wherein an initial load is associated with an initial position of said support structure on said prescribed path; and
wherein said initial load is associated with an initial weighpoint.

18. The method of claim 17:
wherein a second load is associated with a second position of said support structure on said prescribed path; and
wherein said second load is associated with a terminal weighpoint.

* * * * *